United States Patent
Hsu et al.

(10) Patent No.: US 8,958,372 B2
(45) Date of Patent: Feb. 17, 2015

(54) WIRELESS TRANSMISSION DEVICE THAT RECORDS CHANNEL ACTIVITIES AND METHOD THEREOF

(75) Inventors: Liang Wei Hsu, Taipei (TW); Hsin Hung Liu, Taipei (TW)

(73) Assignee: Moxa Inc., Shing Tien (CN)

( * ) Notice: Subject to any disclaimer, the term of this patent is extended or adjusted under 35 U.S.C. 154(b) by 1216 days.

(21) Appl. No.: 12/591,571

(22) Filed: Nov. 24, 2009

(65) Prior Publication Data

US 2011/0122828 A1 May 26, 2011

(51) Int. Cl.
*G06F 17/30* (2006.01)
*H04W 4/00* (2009.01)

(52) U.S. Cl.
USPC .......................................................... 370/329

(58) Field of Classification Search
USPC .......................................................... 370/315
See application file for complete search history.

(56) References Cited

U.S. PATENT DOCUMENTS

| | | | |
|---|---|---|---|
| 2002/0198974 A1* | 12/2002 | Shafer | 709/223 |
| 2005/0065977 A1* | 3/2005 | Benson et al. | 707/104.1 |
| 2008/0117831 A1* | 5/2008 | Nielsen | 370/252 |

\* cited by examiner

*Primary Examiner* — Sulaiman Nooristany
(74) *Attorney, Agent, or Firm* — Bacon & Thomas, PLLC (57) ABSTRACT

This specification disclosed a wireless transmission device that records channel activities and the method thereof. After wireless signals are detected to occupy all of the channels used by the wireless transmission device, the detection information thus obtained is stored in a record file. Clients are allowed to connect to the wireless network device and download the record file for analyses. When the wireless signals are interfered, the invention can determine whether the interference source is nearby or not. This achieves the goal of monitoring the band usage around the wireless network device at a lower cost.

18 Claims, 9 Drawing Sheets

| 510 | 520 | 530 | |
|---|---|---|---|
| ... | | | |
| 2009/4/13 2:28:25 | 5.035GHz | 28dB | |
| 2009/4/13 2:28:25 | 5.745GHz | 13dB | |
| ... | | | |
| 2009/2/8 12:22:48 | 4.92GHz | 22dB | |
| 2009/2/8 12:21:48 | 4.92GHz | 40dB | |
| ... | | | |

WIRELESS TRANSMISSION DEVICE THAT RECORDS CHANNEL ACTIVITIES AND METHOD THEREOF

BACKGROUND OF THE INVENTION

1. Field of Invention

The invention relates to a wireless transmission device and the method thereof In particular, the invention relates to a wireless transmission device that record channel usage and the method thereof 2. Related Art A wireless transmission device is a device that can connect to a wireless network or a wired network (e.g., Ethernet), as an intermediate point of the wired and wireless networks. Within the reception range of the wireless transmission device, wireless clients can enjoy both the benefits of mobility and the network connection. Therefore, wireless clients can transmit data with devices in the wired network.

The wireless transmission device uses wireless signals to exchange data with the wireless clients. The wireless signals transmitted between the wireless transmitting device and the clients fall in a specific band, e.g., the 2.4 GHz band. However, our living environment is also filled with different wireless signals, from microwave ovens, indoor cordless phones, Bluetooth devices, cell phones, radio signals, etc. Such signals will interfere with the wireless signals transmitted between the wireless transmitting device and the clients, thus lowering the reliability of the wireless signals. The transmission data rate between the wireless transmitting device and the clients is also affected. The most serious situation is that the clients completely cannot use the wireless transmitting device.

In fact, as human eyes cannot see the wireless signals, one should us a spectrum analyzer to determine whether the location of the wireless transmitting device has serious interference from other signal sources in order to avoid unnecessary interference during wireless signal transmissions. However, a spectrum analyzer is not cheap. Therefore, normal people would not buy such an analyzer simply for testing the wireless transmitting device. In that case, the wireless transmitting device may be installed at a location where wireless signals are likely to be interfered. Besides, when transmitting wireless signals between the wireless transmitting device and the clients, if the wireless signals are suddenly interfered so that the transmission data rate greatly drops, users usually do not prepare a spectrum analyzer to test the interference. Even if the user really prepares a spectrum analyzer to test the location of the wireless transmitting device, the interference may have some time variation such that it cannot effectively determine whether there is any interference source around the wireless transmitting device.

In summary, the prior art always has the problem of being unable to solve the interference problem around the wireless transmitting device in an effective way. It is thus imperative to provide a better solution.

SUMMARY OF THE INVENTION

In view of the foregoing, the invention discloses a wireless transmitting device that record channel activities and the method thereof.

A first embodiment of the disclosed wireless transmitting device that records channel activities includes: a first transceiver module; a network activity detecting module, which detects whether each channel of the wireless transmitting device is occupied via the first transceiver module; a storing module, which stores the detection information obtained by the network activity detecting module about wireless signals in a record file when some wireless signal is detected to occupy one of the channels; a second transceiver module, which connects to a client for exchanging data with the client; and a record file accessing module, which reads out the record file from the storing module and transmits it to the connected client via the second transceiver module.

A method of recording channel activities according to the invention includes the steps of: using a first transceiver module to detect the network activities of all channels of the wireless transmitting device; storing the detection information in a record file when some wireless signal occupies one of the channels; using a second transceiver module to wait for the connection of a client to the wireless transmitting device while detecting whether any channel is used by a wireless signal; and transmitting the record file to the client connected with the wireless transmitting device via the second transceiver module.

The system and method in the first embodiment of the invention are described above. They differ from the prior art in that the invention uses two transceiver modules. When the first transceiver module detects that some channel of the wireless transmitting device is occupied by wireless signals, the detection information is stored in a record file. The second transceiver module allows the client connected to the wireless transmitting device to download the record file.

A second embodiment of the wireless transmitting device that records channel activities according to the invention includes: a determining module, which determines whether a specific condition is satisfied; a transceiver module, which connects to a client when the determining module determines that the specific condition is not satisfied so that the wireless transmitting device exchanges data with the client; a network activity detecting module, which detects whether each channel of the wireless transmitting device is occupied when the specific condition is determined by the determining module to be satisfied; a storing module, which stores the detection information obtained by the network activity detecting module about the wireless signals in a record file when one of the channels is occupied; a record file accessing module, which reads out the record file from the storing module and transmits it to the client via the transceiver module.

A method of recording channel activities according to the second embodiment of the invention includes the steps of: detecting the network activity of each channel of the wireless transmitting device when a specific condition is determined to be satisfied; when one channel is detected to be occupied by wireless signals, storing the detection information in a record file; waiting a client to connect to the wireless transmitting device when the specific condition is determined to be unsatisfied; and transmitting the record file to the client after the client connects to the wireless transmitting device.

The system and method according to the second embodiment of the invention are described above. They differ from the prior art in that when the specific condition is satisfied, the invention detects whether wireless signals occupy some channel of the wireless transmitting device. If so, the detection information thus obtained is stored in a record file. If not, then the client is allowed to connect to the wireless transmitting device for downloading the record file.

The above-mentioned two systems and methods can solve the problems existing in the prior art. Moreover, they achieve the goal of monitoring the channel usage around the wireless transmitting device at a lower cost.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

The invention involves a wireless transmitting device and the method implemented on the wireless transmitting device. The wireless transmitting device referred herein uses multiple channels to communicate with other wireless transmitting devices in a wireless way. That is, suppose the disclosed wireless transmitting device uses the band ranging from 4.9 GHz to 5.875 GHz to transmit data. Then the channels of the wireless transmitting device are distributed in multiple channels between 4.9 GHz and 5.875 GHz (e.g., 5.18 GHz, 5.24 GHz, and 5.745 GHz). However, the band and channels used by the disclosed wireless transmitting device are not limited to the above-mentioned ones.

A normal wireless transmitting device tries to accept wireless signals transmitted over fixed channels. After being received, the analog wireless signals are filtered, demodulated, and amplified in sequence. The amplified signals are converted by an analog-to-digital (A/D) converter (ADC) into digital data. Thus, the wireless transmitting device can obtain the transmitted data from the wireless signals. The data extracted from the wireless signals are then processed.

In the same spacetime, suppose there are two sets of data to be transmitted over the same channel. Then they will interfere with each other. That is, one wireless transmitting device can only receive data transmitted over some channel at a time. Likewise, the wireless transmitting device can only transmit data over some channel at a time. In the invention, a channel is occupied when some data are transmitted over it.

Figure 1A:
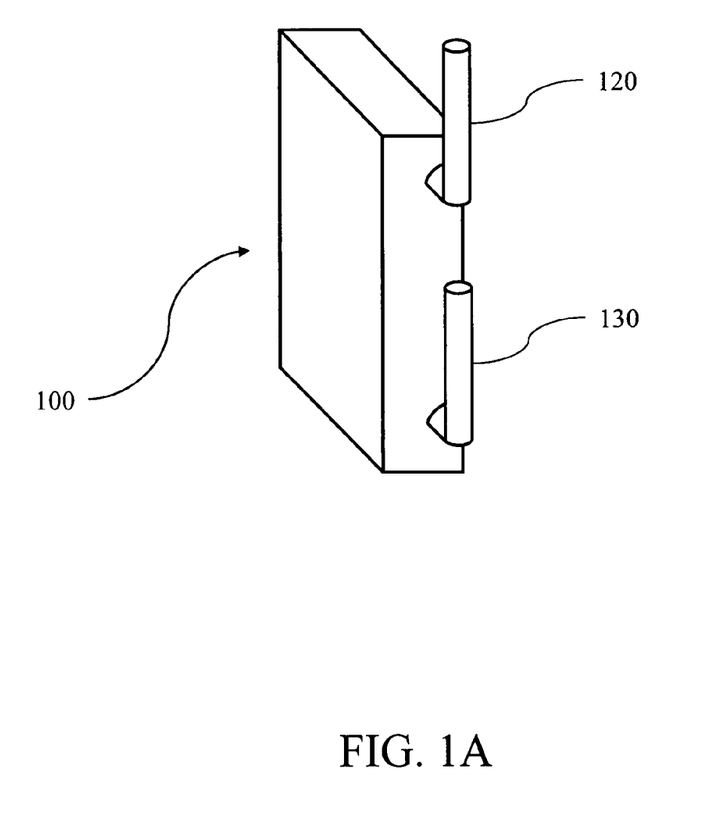
FIG. 1A is a schematic view of the wireless transmitting device that records channel activities according to the first embodiment of the invention.

This specification disclosed two embodiments of the wireless transmitting device. As shown in FIG. 1A, the first embodiment of the wireless transmitting device 100 includes a first transceiver module 120 and a second transceiver module 130. However, the disclosed wireless transmitting device 100 is not limited to using two transceiver modules. As long as the wireless transmitting device 100 has one transceiver module that neither filters nor occupies wireless signals that occupy channels (and thus it does not amplify and perform A/D conversion for the wireless signals), the wireless transmitting device 100 can have more than two transceiver modules. In this case, the wireless transmitting device 100 can use a predetermined transceiver module to monitor the network activities of all channels, and use the other transceiver modules to perform conventional data transmissions.

Figure 1B:
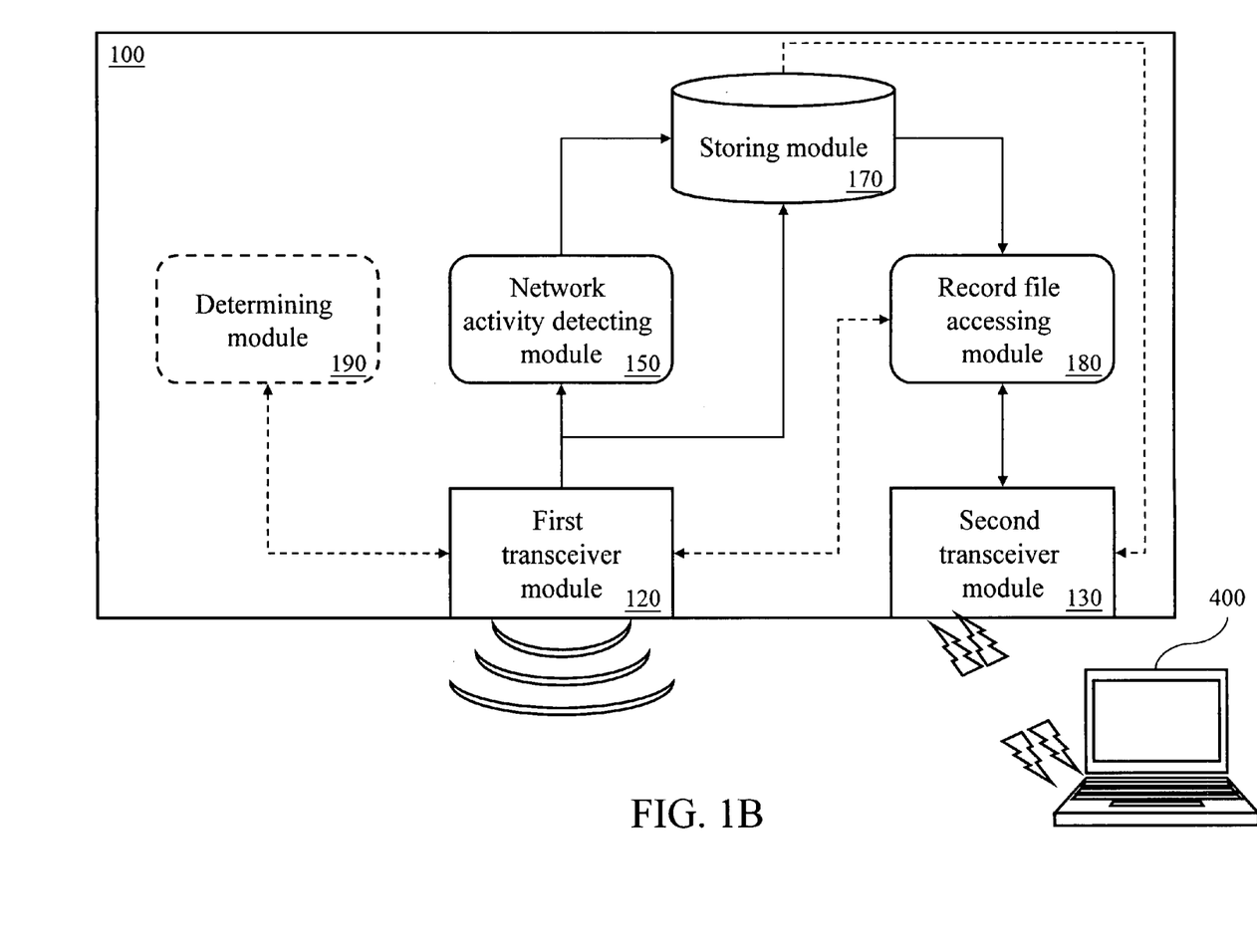
FIG. 1B is a block diagram of the wireless transmitting device that records channel activities according to the first embodiment of the invention.

FIG. 1B is used to explain the operations of the invention using the schematic view of the elements in the disclosed wireless transmitting device that record channel activities. As shown in the drawing, the wireless transmitting device 100 in the first embodiment includes a first transceiver module 120, a second transceiver module 130, a network activity detecting module 150, a storing module 170, and a record file accessing module 180.

The first transceiver module 120 receives the wireless signals transmitted over all channels of the wireless transmitting device 100. After receiving the wireless signals, it does not filter, demodulate, amplify, or perform A/D conversion to the signals.

The second transceiver module 130 waits a client 400 to connect to the wireless transmitting device 100 in a wireless way. After a client 400 connects to the wireless transmitting device 100, its exchanges data between the client 400 and the wireless transmitting device 100 in a wireless way. That is, the wireless transmitting device 100 uses the second transceiver module 130 to send data to the client 400. The data from the client 400 to the wireless transmitting device 100 are also received by the second transceiver module 130.

The network activity detecting module 150 uses the first transceiver module 120 to detect whether each of the channels of the wireless transmitting device 100 is occupied by wireless signals. When the first transmitting channel 120 receives data on some particular channel, it means that data are being transmitted using the particular frequency of the channel. Therefore, the network activity detecting module 150 determines that the channel is occupied by wireless signals.

After the network activity detecting module 150 detects that the channel is occupied by warless signals, it analyzes the ratio between the energy of the wireless signals and that of the background noises in the channel. It then calculates the intensity of the wireless signals using the channel. For example, when the network activity detecting module 150 detects that the power of the wireless signals is −65 dBm and that of the noises is −98 dBm, then the ratio between the wireless signals and the noises can be computed using the formula of "10 log [wireless signal power (W)/noise power (W)]" or "wireless signal power (dBm)−noise power (dBm)". The network activity detecting module 150 thus obtains the intensity of the wireless signals as 33 dB.

Figure 2:
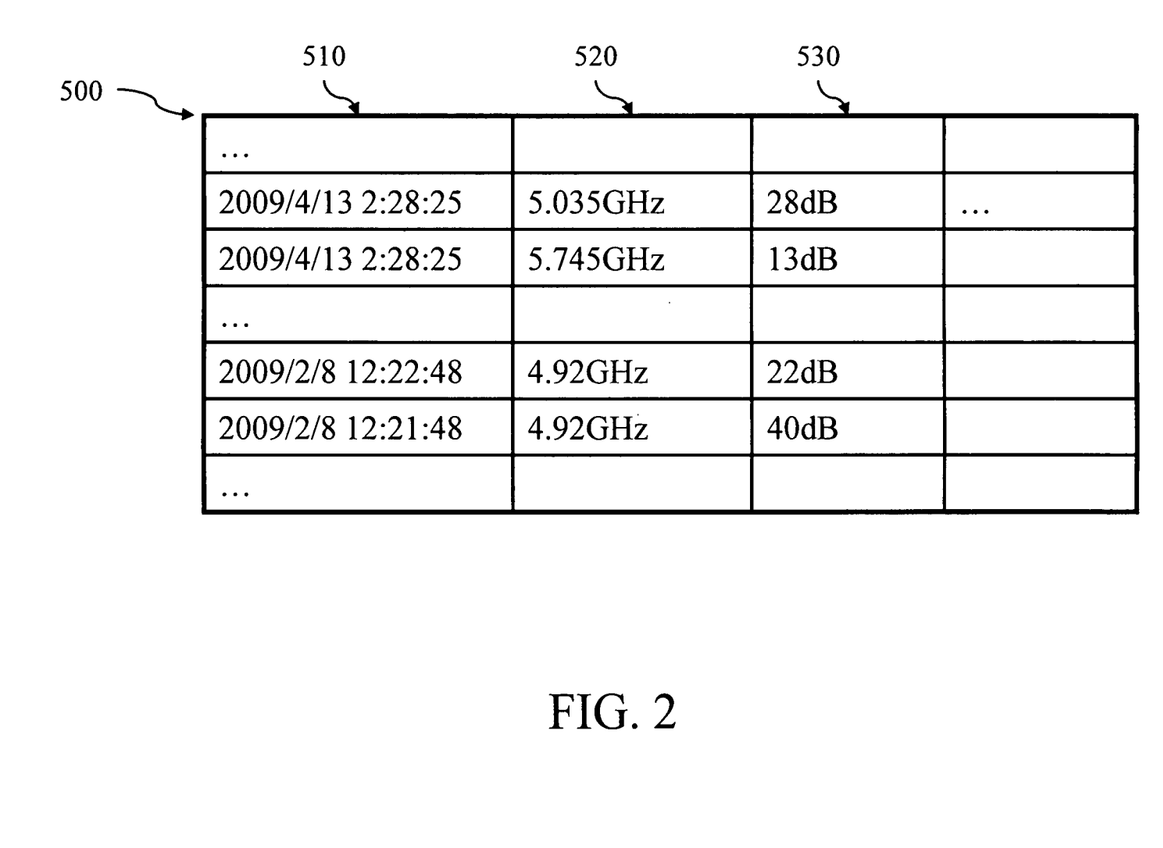
FIG. 2 shows the contents of the record file in the first embodiment.

The storing module 170 stores the detection information obtained by the network activity detecting module 150 when it detects that some channel of the wireless transmitting device 100 is being used by wireless signals. The detection information is stored in the record file 500 in FIG. 2. The record file 500 includes a detection time field 510, a channel field 520, and a signal intensity field 530. These fields store the time when the network activity detecting module 150 detects that some channel is occupied by wireless signals, the frequency of the channel occupied by the wireless signals, and the intensity of the wireless signals using the channel as calculated by the network activity detecting module 150, respectively. However, the detection information of the invention is not limited to the above-mentioned ones. Any data that can be obtained by detecting or analyzing the wireless signals occupying the channel can be one item in detection information. Likewise, the fields in record file of the invention exactly correspond to the items in the detection information. But it is not limited to the detection time field 510, the channel field 520, and the signal intensity field 530.

Generally speaking, the record file used by the storing module 170 to store the detection information such as the frequency of the channel, the intensity of the wireless signals, and the time that the wireless signals are detected has a predetermined filename and is stored in a predetermined directory. However, the invention also allows the client 400 to set the filename and/or directory of the record file after it is connected to the wireless transmitting device 100 via the second transceiver module 130.

The storing module 170 also stores a management interface for the client 400 to connect to the wireless transmitting device 100 via the second transceiver module 130. It enables the client 400 to set the system parameters of the wireless transmitting device 100, to download the record file stored in the storing module 170, or to delete specific contents in the record file (one or multiple sets of data, each of which includes the frequency of the channel in use, the intensity of the wireless signals, and the time that the wireless signals are detected). However, the management interface of the invention is not limited to such functions.

The record file accessing module 180 reads out the record file with the detection information from the storing module 170. It then sends the record file read from the storing module 170 to the client 400 via the second transceiver module 130. After analyzing the record file, the client 400 can set the band or channels that can be used by the second transceiver module 130 via the management interface provided by the wireless transmitting device 100. The second transceiver module 130 then uses the band or channels set by the user to transmit data.

Generally speaking, the record file accessing module 180 reads the record file from the storing module 170 only after the second transceiver module 130 receives the request for downloading the record file from the client 400. The request for downloading the record file received by the second transceiver module 130 is sent out from the client 400 directly using the service provided by the wireless transmitting device 100, such as SFTP, FTP, or some self-defined method. Alternatively, the user uses the second transceiver module 130 to download the management interface stored in the storing module 170, and then sends out the request for downloading the record file in HTTP via the management interface. Nevertheless, the method of asking to download the record file is not limited to the examples mentioned above.

In fact, the record file accessing module 180 also reads out the record file from the storing module 170 after the second transceiver module 130 receives the request of deleting specific contents in the record file as sent from the client 400. In this case, it deletes the corresponding data therein and writes the modified record file back into the storing module 170.

Besides, the disclosed wireless transmitting device 100 can further include a determining module 190 to determine whether a specific condition is met. The specific condition checked by the determining module 190 may have more than one item. Such items include whether the first transceiver module 120 is transmitting data, whether the hardware switch that controls the operating mode of the first transceiver module 120 is turned on (set), whether the software parameters that control the operating mode of the first transceiver module 120 are already set, and whether the system time of the wireless transmitting device 100 is the same as, for example, 02:05 or between, for example, 02:08 and 04:13. However, the invention is not limited to these examples.

In the following, the first embodiment is used to explain how the disclosed system and method operate. Please refer at the same time to FIG. 3, which is a flowchart of the disclosed method that record channel activities according to the invention.

Figure 3:
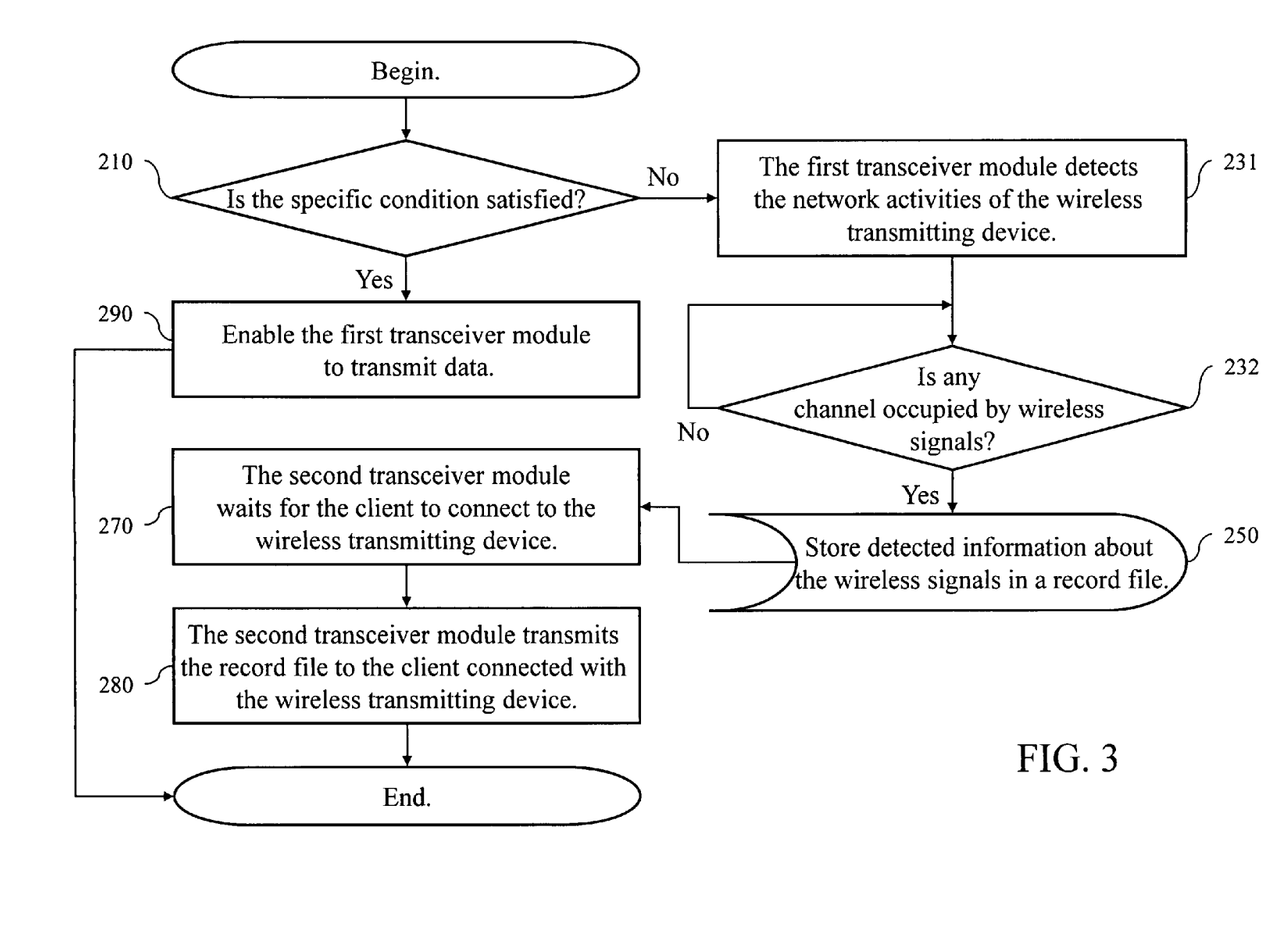
FIG. 3 is a flowchart of the method of recording channel activities according to the first embodiment of the invention.

In this embodiment, the wireless transmitting device 100 is assumed to be an access point (AP) with two antennas. The user uses the wireless network AP to detect network activities. In particular, the two antennas on the wireless network AP are the first transceiver module 120 and the second transceiver module 130.

First, the wireless network AP (wireless transmitting device 100) receives wireless signals transmitted over all the channels of the wireless network AP. The received wireless signals are provided to the network activity detecting module 150 for it to detect the network activities of all channels of the wireless network AP via the first antenna (step 231). Suppose the wireless network AP uses the band of 2.4 GHz to 2.4835 GHz. Then the first antenna receives wireless signals in the channels of 2.422 GHz, 2.427 GHz . . . 2.452 GHz, etc. The network activity detecting module 150 thus detects whether there are any network activities on the channels of 2.422 GHz, 2.427 GHz . . . 2.452 GHz, etc. That is, it detects whether any wireless signal is being transmitted.

While the network activity detecting module 150 detects network activities on various channels using the first antenna (step 231), it also detects whether any wireless signal occupies a channel according to the network activities. That is, the network activity detecting module 150 detects whether each channel is occupied by wireless signals (step 232). Suppose in this embodiment that there are wireless signals active on the channel of 2.432 GHz. After the first antenna receives wireless signals active on the channel of 2.432 GHz, the network activity detecting module 150 finds that the channel of 2.432 GHz is being occupied by wireless signals. It further computes the intensity of the wireless signals on that channel, such as 30 dB.

Afterwards, the storing module 170 stores the frequency of the channel occupied by the wireless signals, the intensity of the wireless signals on the channel, and the time that the wireless signals are detected into the record file (step 250). That is, the frequency "2.432 GHz", the intensity "30 dB", and the time "Apr. 16, 2009 4:13:28" are stored into the record file.

In fact, while the network activity detecting module 150 in the wireless network AP uses the first antenna to detect the network activities of the channels of the wireless network AP (step 231), the second antenna (the second transceiver module 130) thereof waits for a client 400 to establish a connection with the wireless network AP. After client 400 connects to the wireless network AP (step 270), the client 400 can uses the network provided by the wireless network AP. That is, after the client 400 connects to the wireless network AP (step 270), the client 400 can use the services provided by the wireless network AP to download the record file from the wireless network AP that records frequency, intensity, and time.

Suppose the service provided by the wireless network AP is HTTP. The user can run a browser on the client 400 and operate the browser to connect to the wireless network AP via port 8080. After the second antenna of the wireless network AP receives the connection request from the client 400, it returns to the management interface 600 stored in the storing module 170 of the wireless network AP. In this embodiment, the service provided by the wireless network AP is HTTP.

Figure 4:
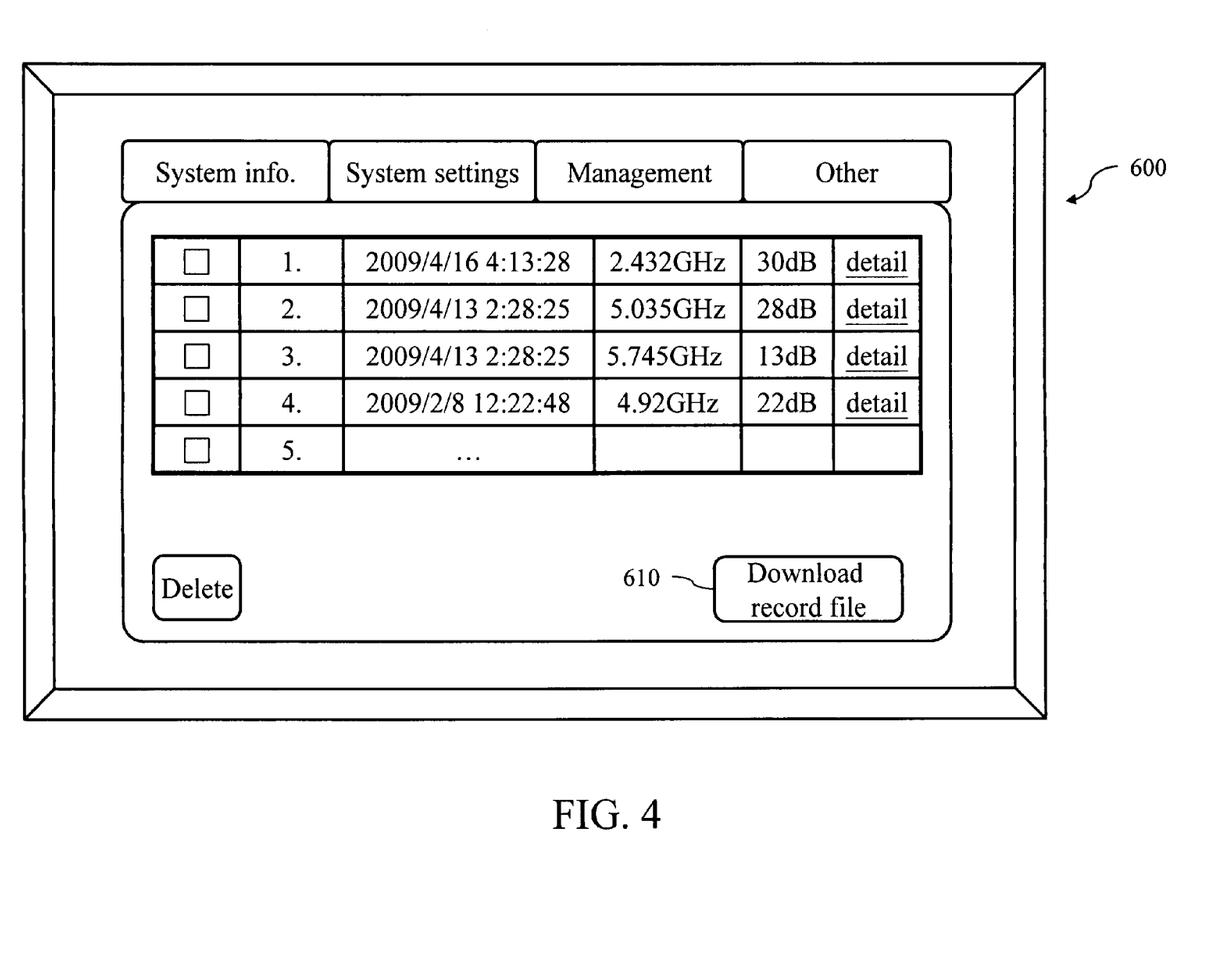
FIG. 4 is a schematic view of the management interface according to the invention.

Therefore, the management interface 600 stored in the storing module 170 is presented as a web page, as shown in FIG. 4.

After the client 400 receives the management interface 600 transmitted by the second antenna of the wireless network AP, it executes the browser on the client 400 to display the management interface 600. The user can operate in the management interface 600 displayed in the browser. After the user clicks the button 610 of downloading the record file in the management interface 600, the browser at the client 400 sends out a request for downloading the record file using the service provided by the wireless network AP to the second antenna.

After the second antenna of the wireless network AP receives the request of downloading the record file from the client 400, the record file accessing module 180 in the wireless network AP reads out the record file from the storing module 170 of the wireless network AP. The record file is then transmitted back to the client 400 using the service provided by the wireless network AP (step 280). Therefore, the user can analyze the record file downloaded to the client 400 to know the network activities around the wireless network AP.

In this embodiment, if the wireless network AP includes the determining module 190, then it first determines whether a specific condition is satisfied (step 210) to decide the operating mode of the first antenna. Suppose the specific condition is whether the hard switch that controls the operating mode of the first transceiver module 120 is turned on or the software parameters that control the operating mode of the first transceiver module 120 are set (the invention, however, is not limited by these examples). When the specific condition is satisfied, the determining module 190 enables the first antenna to enter the data transmission mode. That is, the first antenna filters and demodulates all received wireless signals to obtain the data in the wireless signals. The data are thus transmitted via the first antenna (step 290). If the specific condition is not met (i.e., the hard switch that controls the transmitting function of the first transceiver module 120 is turned off or the software parameters that control the transmitting function of the first transceiver module 120 are not set), then the determining module 190 enables the first antenna to enter the operating mode of detecting network activities. In this case, the first antenna does not filter and demodulate the received wireless signals. The network activity detecting module 150 then detects the network activities over the channels of the wireless network AP via the first antenna (step 231).

Figure 5A:
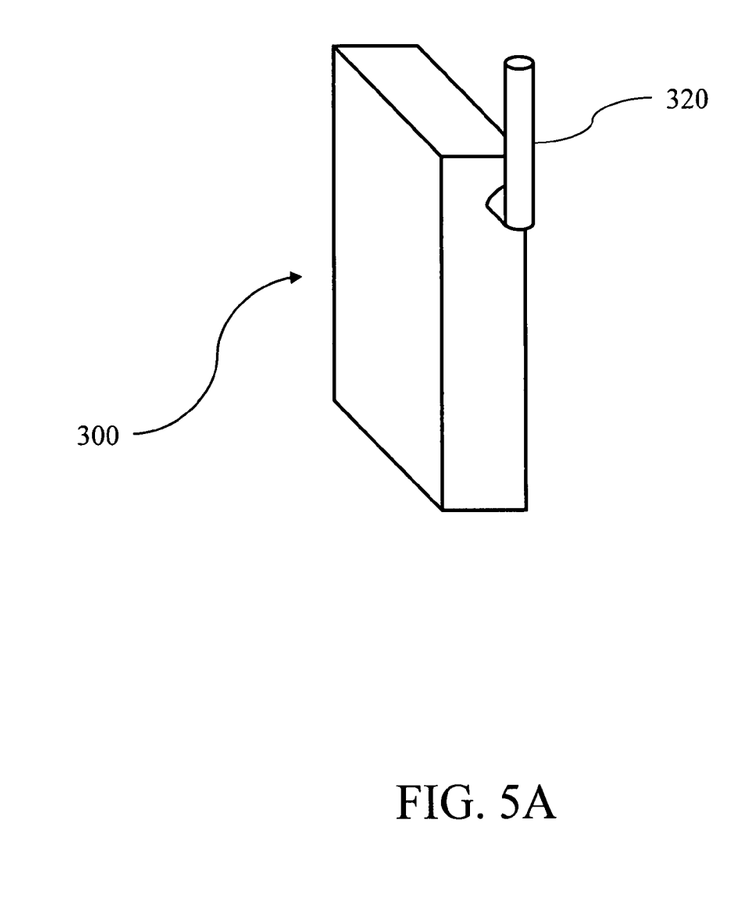
FIG. 5A is a schematic view of the wireless transmitting device that records channel activities according to the second embodiment of the invention.

The following paragraphs describe the wireless transmitting device 300 according to a second embodiment of the invention. As shown in FIG. 5A, even though the wireless transmitting device 300 includes only one transceiver module 320, it should be mentioned that the transceiver module 320 can be set not to filter, demodulate, amplify, and perform A/D conversion to the wireless signals occupying the channel. Therefore, the wireless transmitting device 300 switches between the operating mode of transmitting data as in the conventional wireless transmitting device and the operating mode of detecting network activities in all channels.

Figure 5B:
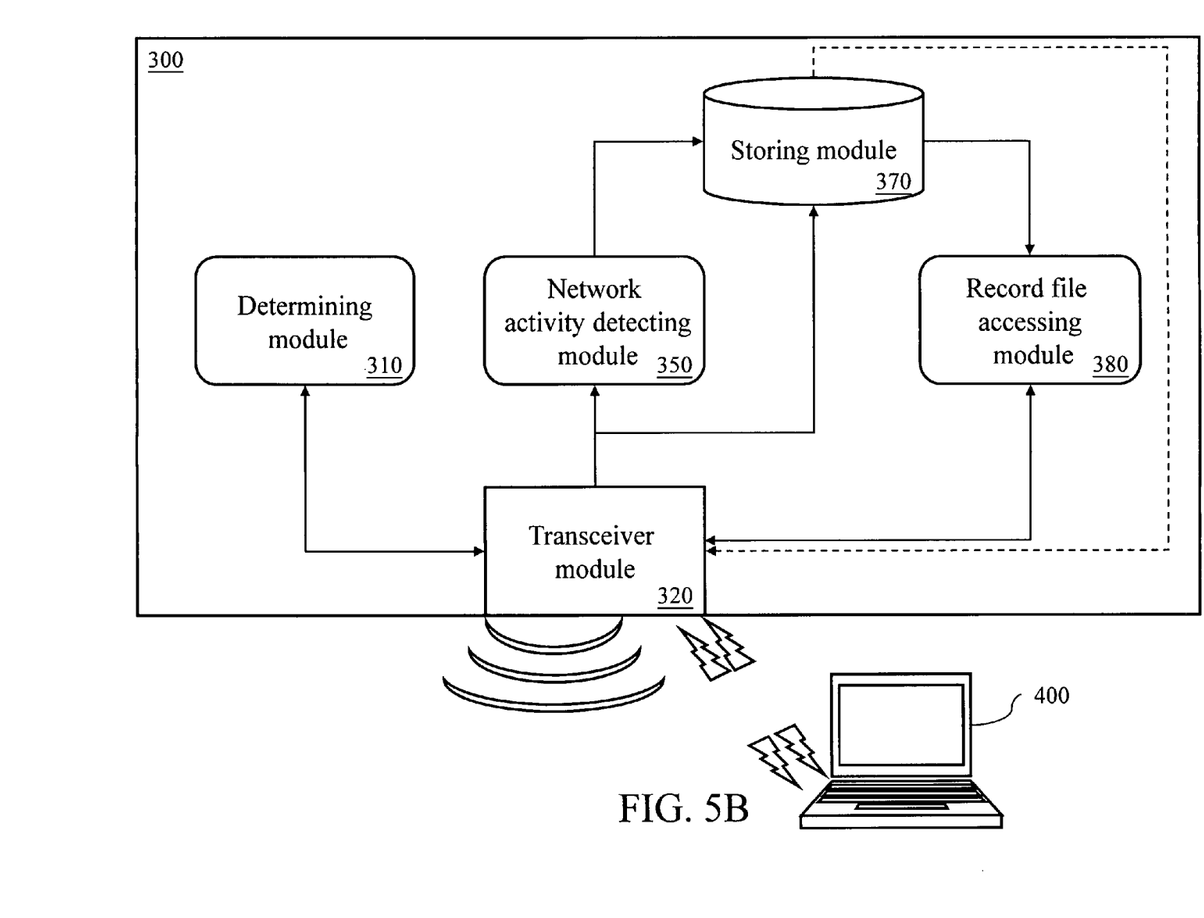
FIG. 5B is a block diagram of the wireless transmitting device that records channel activities according to the second embodiment of the invention.

FIG. 5B shows the elements of the disclosed wireless transmitting device. As shown in the drawing, the wireless transmitting device 300 in the second embodiment includes: a determining module 310, a transceiver module 320, a network activity detecting module 350, a storing module 370, and a record file accessing module 380. The determining module 310, the storing module 370, and the record file accessing module 380 of the wireless transmitting device 300 have the same functions as the determining module 190, the storing module 170, and the record file accessing module 180 in the wireless transmitting device 100. Therefore, they are not further described here again.

When the determining module 310 determines that the specific condition is not met, the transceiver module 320 waits for the client 400 to connect with the wireless transmitting device 300. After the client 400 connects to the wireless transmitting device 300, data communications between the client 400 and the wireless transmitting device 300 are enabled, so that the client 400 can download the record file stored in the storing module 370. When the determining module 310 determines that the specific condition is satisfied, the transmitting module 320 receives the wireless signals transmitted over all channels of the wireless transmitting device 100. Afterwards, it does not filter, demodulate, amplify and convert the received wireless signals.

The network activity detecting module 350 and the network activity detecting module 150 in the wireless transmitting device 100 are similar. They only differ in that the network activity detecting module 350 in the wireless transmitting device 300 only uses the transceiver module 320 to detect whether the channels in the wireless transmitting device 300 are occupied when the determining module 310 determines that the specific condition is satisfied.

The second embodiment is then used to explain how the disclosed system and method function. Please also refer to FIG. 6 for the flowchart of the disclosed method that record channel activities. In this embodiment, the wireless transmitting device 300 is also assumed to be a wireless network AP. However, it differs from the first embodiment in that the wireless network AP has only one antenna (transceiver module 320) in this embodiment.

Figure 6:
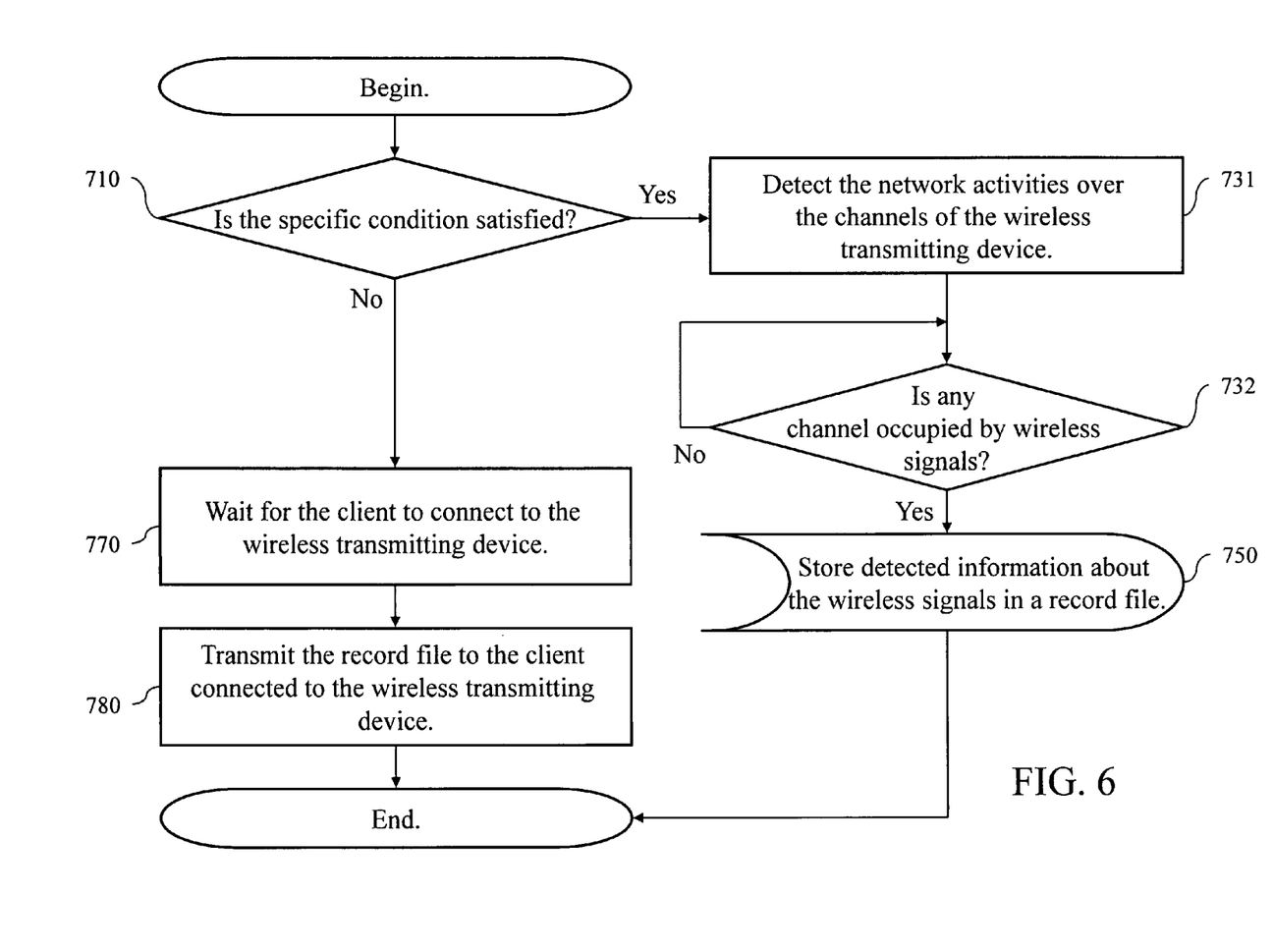
FIG. 6 is a flowchart of another method of recording channel activities according to the second embodiment of the invention.

After the wireless network AP starts, the determining module 310 first determines whether the specific condition is satisfied (step 710) to determine the operating mode of the antenna. Suppose in this embodiment, the specific condition is that the transceiver module 320 has not sent data or the system time of the wireless transmitting device 100 is between 02:08 and 04:13. However, the invention is not limited to these examples.

When the determining module 310 determines that the specific condition is satisfied (i.e., when the transceiver module 320 does not send data or the system time of the wireless network AP (the wireless transmitting device 300) falls between 02:08 and 04:13), then the determining module 310 enables the antenna to enter the operating mode of detecting network activities. Therefore, the wireless network AP uses the antenna to receive the wireless signals over the channels thereof. The network activity detecting module 350 can thus obtain the network activities of various channels of the wireless network AP using the first antenna (step 731), thereby detecting whether any channel is occupied by wireless signals (step 732). It further computes the intensity of the wireless signals that occupy some channel. Afterwards, the storing module 370 stores the information of the frequency of the channel occupied by wireless signals, the intensity of the wireless signals in the occupied channel, and the time that the wireless signals are detected into the record file (step 750).

When the determining module 310 determines that the specific condition is not met, the determining module 310 enables the antenna to enter the operating mode of transmitting data. That is, the antenna filters and demodulates all the received wireless signals, thereby obtaining the data transmitted over the wireless signals. So data can be transmitted via the antenna. In this case, the antenna waits for the client 400 to send in the request for connection. After the wireless network AP grants the connection request of the client 400, a connection is established between the client 400 and the wireless network AP, so that the client 400 is connected to the wireless network AP (step 770) and uses the network provided by the wireless network AP. Afterwards, the client 400 can downloads the record file from the wireless network AP.

Suppose the wireless network AP allows the client 400 to download the record file using a developer-defined way. The user can execute an application provided by the developer to connect to the wireless network AP. After the antenna of the wireless network AP receives the connection of the client 400, the record file accessing module 380 of the wireless network AP reads out the record file from the storing module 370 thereof. The record file is then packaged in the developer-defined format and sent via the antenna to the client 400 (step 780). Thus, the user can analyze the record file downloaded to the client 400, thereby knowing the network activities around the wireless network AP.

In summary, the invention differs from the prior art in storing the detection information in a record file when it detects that some wireless signals occupy the channels of the wireless transmitting device. It further enables the client to download the record file from the wireless transmitting device for analysis. This technique solves the problem that the prior art cannot effectively determine whether there is any interference around the wireless transmitting device. It monitors the channel usage around the wireless transmitting device at a lower cost.

Figure 7:
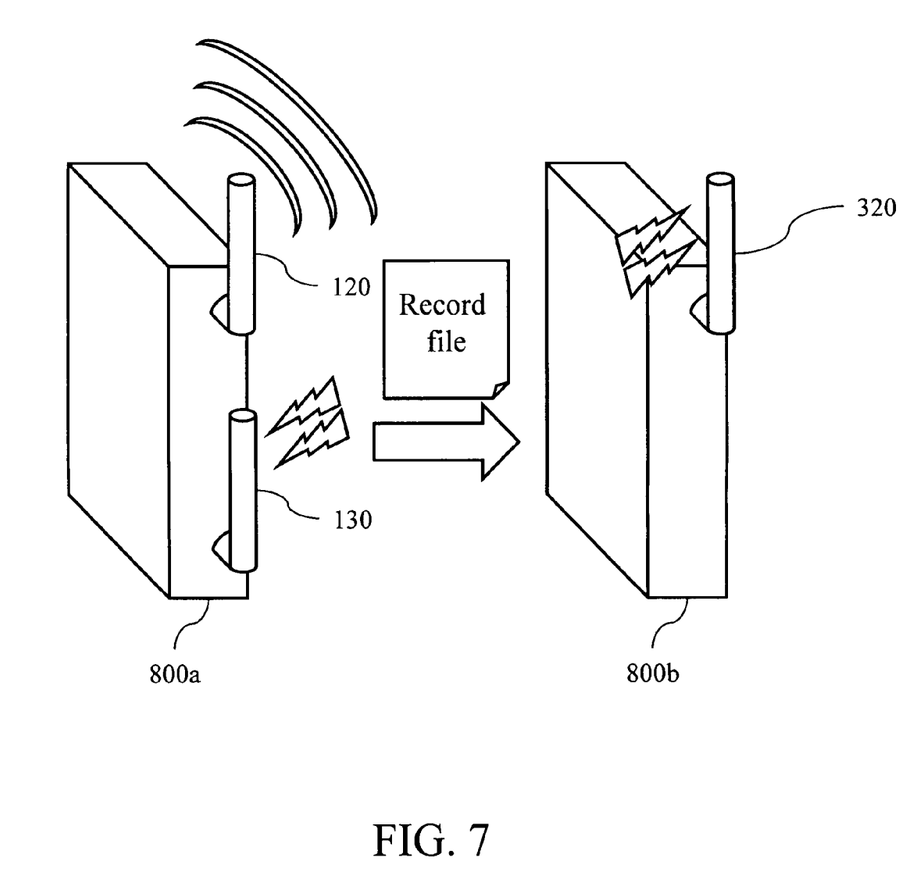
FIG. 7 shows that two wireless transmitting devices of the invention transmit a record file.

Besides, in addition to the digital devices such as the computer used by the user as the client 400 in the invention, the client 400 can also be the wireless transmitting device 100 or the wireless transmitting device 300. As shown in FIG. 7, there are two wireless transmitting devices of the invention: the first wireless transmitting device 800*a* and the second wireless transmitting device 800*b*. They can be an arbitrary combination of the disclosed wireless transmitting device 100 and the disclosed wireless transmitting device 300. Suppose that the first wireless transmitting device 800*a* is the disclosed wireless transmitting device 100 and the second wireless transmitting device 800*b* is the disclosed wireless transmitting device 300 here. It is noted that the invention is not limited to this implementation. Since the first wireless transmitting device 800*a* is the above-mentioned wireless transmitting device 100, it uses the second transceiver module 130 to transmit data. As the second wireless transmitting device 800*b* is the above-mentioned wireless transmitting device 300, it uses the transceiver module 320 to transmit data. (The determining module 310 in the second wireless transmitting device 800*b* determines whether the specific condition is satisfied.) If the first wireless transmitting device 800*a* is the disclosed wireless transmitting device 300, then it uses the transceiver module 320 to transmit data. Likewise, if the second wireless transmitting device 800*b* is the disclosed wireless transmitting device 100, then it uses the second transceiver module 130 to transmit data.

It should be mentioned that when the first wireless transmitting device 800*a* and the second wireless transmitting device 800*b* can exchange data, the wireless transmitting device 100 and the wireless transmitting device 300 have an access point mode and a client mode. The wireless transmitting device that transmits data is in the client mode, and the wireless transmitting device that receives data is in the access point mode.

When the first wireless transmitting device 800*a* and the second wireless transmitting device 800*b* can exchange data, the record file accessing module 180 of the first wireless transmitting device 800*a* first reads out the record file in the storing module 170 of the first wireless transmitting device 800*a*. Afterwards, the second transceiver module 130 of the first wireless transmitting device 800*a* transmits the record file to the second wireless transmitting device 800*b*. After the transceiver module 320 of the second wireless transmitting device 800*b* receives the record file transmitted from the first wireless transmitting device 800*a*, the storing module 370 of the second wireless transmitting device 800*b* stores the record file received by the transmitting module 320 of the second wireless transmitting device 800*b*. Therefore, the storing module 370 of the second wireless transmitting device 800*b* simultaneously stores the record file recorded by the first wireless transmitting device 800*a* and the record file recorded by the second wireless transmitting device 800*b* for the user to download simultaneously. The user can thus analyze the actual network activities in the data transmission range covered by the first wireless transmitting device 800*a* and the second wireless transmitting device 800*b*.

Moreover, the disclosed method of recording channel activities can be implemented in hardware, software, and their combination. It can be implemented in a centralized way in a computer system. It can also be implemented in a distributive way by having different elements in several connected computer systems.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A wireless transmitting device for recording channel activities, comprising:
   a first transceiver module, which receives wireless signals transmitted over channels of the wireless transmitting device connecting to other wireless transmitting devices;
   a network activity detecting module, which uses the first transceiver module to detect whether the channels of the wireless transmitting device are occupied;
   a storing module, which stores detection information obtained by the network activity detecting module in a record file after a wireless signal is detected to occupy one of the channels;
   a second transceiver module, which connects with a client for the wireless transmitting device to exchange data with the client; and
   a record file accessing module, which reads out the record file from the storing module and sends the record file to the client via the second transceiver module;
   wherein the wireless transmitting device does not filter and demodulate the wireless signals to obtain the detection information;
   wherein the second transceiver module further receives a filename and/or a storage directory of the record file set by the client via a management interface and the storage module establishes the record file according to the filename and/or storage directory.

2. The wireless transmitting device of claim 1, wherein the detection information includes at least the frequency of the occupied channel, the intensity of the wireless signal, and the time that the wireless signal is detected.

3. The wireless transmitting device of claim 1, wherein the second transceiver module transmits the management interface to the client and receives a request for downloading the record file sent from the client via the management interface, and the record file accessing module reads out the record file after the second transceiver module receives the request.

4. The wireless transmitting device of claim 3, wherein the storing module further stores the management interface.

5. The wireless transmitting device of claim 1 further comprising a determining module, which determines whether a specific condition is satisfied and enables the first transceiver module for data transmissions when the specific condition is not satisfied.

6. The wireless transmitting device of claim 5, wherein the specific condition is that the first transceiver module has not transmitted data, that the hardware switch or software parameters that control the operating mode of the first transceiver module have been set, or that the system time of the wireless transmitting device is the same as a specific time or between two different specific times.

7. The wireless transmitting device of claim 1, wherein the second transceiver module transmits the record file to another wireless transmitting device and receives another record file transmitted from the other wireless transmitting device, and the storing module further stores the other record file.

8. A method for recording channel activities applied to a wireless transmitting device having a first transceiver module and a second transceiver module, the method comprising the steps of:
receiving wireless signals transmitted over channels of the wireless transmitting device without connecting to other wireless transmitting devices by the first transceiver module;
storing detection information in a record file after a wireless signal received by the first transceiver module is detected to occupy one of the channels, wherein the wireless transmitting device does not filter and demodulate the wireless signals to obtain the detection information;
using the second transceiver module to wait for a client to connect to the wireless transmitting device while detecting whether any of the channels is occupied by wireless signals; and
transmitting the record file via the second transceiver module to the client connected to the wireless transmitting device;
wherein the second transceiver module further receives a filename and/or a storage directory of the record file set by the client via a management interface and the storage module establishes the record file according to the filename and/or storage directory.

9. The method of claim 8, wherein the second transceiver module transmits the management interface to the client in the step of transmitting the record file via the second transceiver module to the client, and the second transceiver module transmits the record file to the client after receiving a request for downloading the record file from the client via the management interface.

10. The method of claim 8 further comprising the step of enabling the first transceiver module to transmit data when the first transceiver module has not transmitted data, the hardware switch or software parameters that control the operating mode of the first transceiver module are set, or the system time of the wireless transmitting device is the same as a specific time or between two different specific times.

11. A wireless transmitting device for recording channel activities, comprising:
a determining module, which determines whether a specific condition is satisfied;
a transceiver module, which connects to a client when the determining module determines that the specific condition is not satisfied so that the wireless transmitting device exchange data with the client, and receives wireless signals transmitted over channels of the wireless transmitting device without connecting to other wireless transmitting devices;
a network activity detecting module, which detects whether any of the channels of the wireless transmitting device is occupied when the determining module determines that the specific condition is satisfied;
a storing module, which stores detection information obtained by the network activity detecting module in a record file after a wireless signal is detected to occupy one of the channels; and
a record file accessing module, which reads out the record file from the storing module and sends the record file to the client via the transceiver module;
wherein the wireless transmitting device does not filter and demodulate the wireless signals to obtain the detection information;
wherein the second transceiver module further receives a filename and/or a storage directory of the record file set by the client via a management interface and the storage module establishes the record file according to the filename and/or storage directory.

12. The wireless transmitting device of claim 11, wherein the detection information includes at least the frequency of the occupied channel, the intensity of the wireless signal, and the time that the wireless signal is detected.

13. The wireless transmitting device of claim 11, wherein the transceiver module transmits the management interface to the client and receives a request for downloading the record file sent from the client via the management interface, and the record file accessing module reads out the record file after the second transceiver module receives the request.

14. The wireless transmitting device of claim 11, wherein the specific condition is that the transceiver module has not transmitted data, the hardware switch or software parameters that control the operating mode of the first transceiver module are set, or the system time of the wireless transmitting device is the same as a specific time or between two different specific times.

15. The wireless transmitting device of claim 11, wherein the transceiver module transmits the record file to another wireless transmitting device and receives another record file transmitted from the other wireless transmitting device, and the storing module further stores the other record file.

16. A method for recording channel activities applied to a wireless transmitting device having a first transceiver module and a second transceiver module, the method comprising the steps of:
receiving wireless signals transmitted over channels of the wireless transmitting device without connecting to other wireless transmitting devices when a specific condition is satisfied;
storing detection information in a record file after a wireless signal is detected to occupy one of the channels, wherein the wireless transmitting device does not filter and demodulate the wireless signals to obtain the detection information;
waiting for a client to connect to the wireless transmitting device when the specific condition is not satisfied; and
transmitting the record file to the client connected to the wireless transmitting device;
wherein the second transceiver module further receives a filename and/or a storage directory of the record file set by the client via a management interface and the storage module establishes the record file according to the filename and/or storage directory.

17. The method of claim 16, wherein the management interface is transmitted to the client in the step of transmitting the record file to the client, and the record file is transmitted to the client after receiving a request for downloading the record file from the client via the management interface.

18. The method of claim 16, wherein the step of determining whether the specific condition is satisfied determines whether the first transceiver module has transmitted data, the hardware switch or software parameters that control the operating mode of the first transceiver module are set, or the system time of the wireless transmitting device is the same as a specific time or between two different specific times.

* * * * *